UNITED STATES PATENT OFFICE.

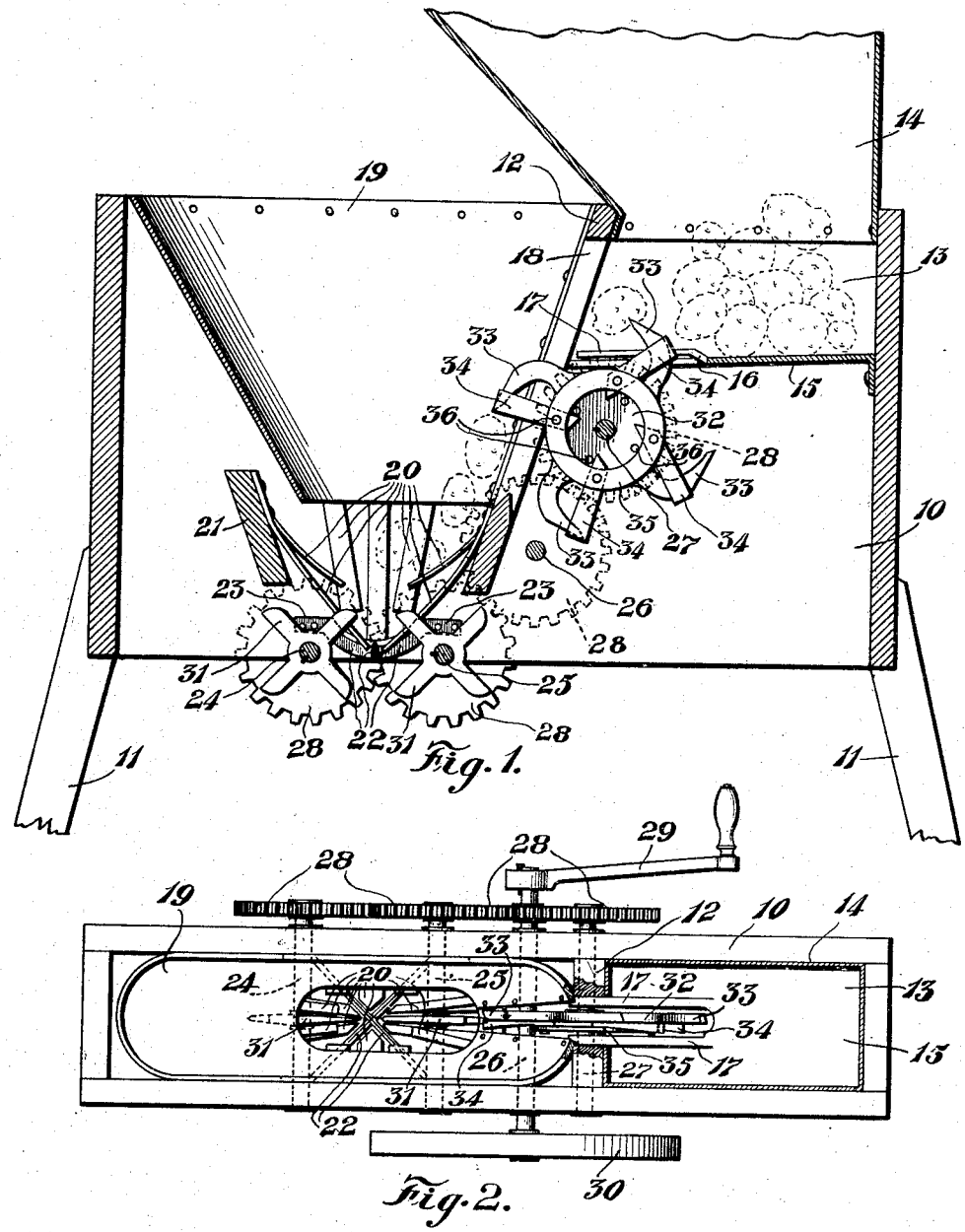

MICHAEL S. KING, OF BLACKFOOT, IDAHO.

POTATO-CUTTER.

1,227,056.  Specification of Letters Patent.  Patented May 22, 1917.

Application filed June 29, 1916. Serial No. 106,691.

*To all whom it may concern:*

Be it known that I, MICHAEL S. KING, a citizen of the United States, residing at Blackfoot, in the county of Bingham and State of Idaho, have invented certain new and useful Improvements in Potato-Cutters, of which the following is a specification.

This invention relates to an improved potato cutter and the principal object of the invention is to provide a potato cutter having an improved type of feeding mechanism for delivering the potatoes into the hopper and to further provide improved means for accurately cutting the potatoes.
Another object of the invention is to provide improved means for holding the potatoes in the proper position and to further provide improved means for engaging the potatoes and moving them downwardly into engagement with the cutting knives.

Another object of the invention is to so construct the mechanism for delivering the potatoes to the hopper of the cutting mechanism that they may be individually lifted from the supply trough or hopper and conveyed into the hopper of the cutting mechanism and after reaching the cutting hopper, detach from the carrying arm.

Another object of the invention is to so construct the machine that the delivering wheel and compressing wheels may be driven from a single source of power.

This invention is illustrated in the accompanying drawings, wherein:—
Figure 1 is a view showing the improved machine in vertical longitudinal section, the upper portion of the hopper of the supply trough being broken away.

Fig. 2 is a top plan view, certain portions of the machine being shown in longitudinal transverse section.

The frame or housing 10 of this machine is supported by the legs 11 and is provided intermediate its length with a transversely extending partition 12 forming one wall of the supply trough 13. The supply trough is provided with a hopper 14 for permitting potatoes to be easily dumped into the trough and is provided with a flooring or bottom 15 having a passageway 16 formed therein through a struck-up tongue 17. A passageway 18 is formed in this partition 12 so that access may be had to the interior of the cutting hopper 19, the lower end of which terminates short of the lower end of the par-
tition 12. Spring arms 20 are carried by the
hopper and the lower end portion of the partition 12 and also by a cross bar 21 secured in the housing 10 to one side of the lower end of the hopper 19. These arms extend as clearly shown in the drawing so that a potato will be grasped and held in the proper position above the knives 22. These knives 22 are arcuate longitudinally and are provided at their ends with seats 23 secured to the side walls of the housing. It will thus be seen that when the potatoes are forced against the sharpened upper edges of these cutting knives, they will be cut into four pieces of substantially the same size.

Shafts 24, 25, 26 and 27 are rotatably carried in bearings mounted in the side walls of the housing and carry gears 28 which mesh and thus permit rotary movement to be transmitted from the shaft 26 to the shafts 24, 25 and 27. This shaft 26 which will be termed the driving shaft is provided with a crank handle 29 and fly wheel 30 so that the machine may be operated with a minimum amount of labor. It is of course obvious that if desired the crank handle could be done away with and a pulley placed thereon so that the machine could be operated from a suitable motor by means of a belt. The shafts 24 and 25 carry pressure wheels 31, the arms of which extend so that they may engage a potato positioned between the lower end portions of the resilient strips 20 and move the same downwardly so that the knives 22 will cut through the potato. Upon the shaft 27 there is mounted a disk 32 having engaging or carrying prongs 33 extending therefrom and provided with sharpened free end portions so that these arms may engage the potatoes and by lifting the potatoes, carry them through the passageway 18 into the hopper 19. Strikers 34 are pivotally connected with this disk 32 between the disk and the side rim or band 35 and are limited in their swinging movement in one direction by means of the abutment pins 36. Therefore when the disk rotates, the engaging arms will carry the potatoes through the passageways into the hopper 19 and when the arm about reaches the position shown at the left of Fig. 1 the striker will move forwardly and will strike the potato thus knocking it from the arm and permitting the potato to drop down into the hopper.

It will thus be seen that when in use, the potatoes will be placed in the hopper 14 through which they will pass into the supply trough 13 and that when the shaft 26 is rotated through the medium of the crank 29, the potatoes will be conveyed from the trough 13 into the hopper 19 where they will be struck from the carrying arms and dropped through the hopper 19 into engagement with the resilient strips 20, which will hold the potatoes in the proper position for permitting the arms of the pressure wheels 31 to engage the potatoes and move them down into engagement with the knives 22. Therefore the machine does not need any care when in use other than simply to place the potatoes in the trough 13 and turn the crank handle 29. A suitable receptacle will be placed beneath the machine to catch the cut potatoes. It will therefore be seen that the potatoes can be very easily and quickly cut up for planting purposes and further that the potatoes will all be substantially cut into quarters.

What is claimed is:—

1. A potato cutting machine including a trough, a hopper communicating with said trough, means for lifting potatoes out of said trough and conveying the same into said hopper, and means carried by said lifting means for detaching potatoes from said lifting means after being conveyed into said hopper.

2. A potato cutting machine including a hopper, a trough communicating with said hopper, rotatably mounted conveying means provided with arms moving through said trough and into said hopper as said conveying means rotates, said arms engaging potatoes and lifting the same into said hopper, and detaching means movably connected with said conveyer and having movement toward the free ends of the arms to detach potatoes from the arms within said hopper.

3. A potato cutting machine including a hopper and a trough communicating with said hopper, a disk rotatably mounted beneath said trough, arms extending from said disk and having sharpened end portions, strikers pivotally connected with said disk and extending toward the free ends of said arms, and means for limiting the pivotal movement of said strikers toward the free ends of said arms.

In testimony whereof I affix my signature in presence of two witnesses.

MICHAEL S. KING.

Witnesses:
WILLIAM REAVIO,
WILLAN S. BARTOLOW.

Copies of this patent may be obtained for five cents each, by addressing the "Commissioner of Patents. Washington, D. C."